United States Patent
Dhingra et al.

(10) Patent No.: US 11,347,944 B2
(45) Date of Patent: May 31, 2022

(54) SYSTEMS AND METHODS FOR SHORT TEXT IDENTIFICATION

(71) Applicant: Walmart Apollo, LLC, Bentonville, AR (US)

(72) Inventors: Karun Dhingra, Bentonville, AR (US); Xiaohu Lei, Centerton, AR (US); Yunus Kamal, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 159 days.

(21) Appl. No.: 16/773,697

(22) Filed: Jan. 27, 2020

(65) Prior Publication Data

US 2021/0232766 A1 Jul. 29, 2021

(51) Int. Cl.
*G06F 40/20* (2020.01)
*G06F 40/284* (2020.01)
*G06F 40/30* (2020.01)
*G06F 17/16* (2006.01)
*G06F 40/216* (2020.01)

(52) U.S. Cl.
CPC ............ *G06F 40/284* (2020.01); *G06F 17/16* (2013.01); *G06F 40/216* (2020.01); *G06F 40/30* (2020.01)

(58) Field of Classification Search
CPC ...... G06F 40/20; G06F 40/205; G06F 40/279; G06F 40/284; G06F 40/289; G06F 40/295; G06F 40/30; G06N 20/20
USPC ............ 704/1, 9; 706/20; 707/737, 738, 739
See application file for complete search history.

(56) References Cited

U.S. PATENT DOCUMENTS

| 9,575,952 | B2 | 2/2017 | Kumar Rangarajan Sridhar |
| 11,049,409 | B1 * | 6/2021 | Zhang .................... G06F 40/20 |
| 2003/0208485 | A1 * | 11/2003 | Castellanos ......... G06F 16/3326 |

(Continued)

FOREIGN PATENT DOCUMENTS

| CN | 106649853 A | 5/2017 |
| CN | 107357899 A | 11/2017 |

(Continued)

OTHER PUBLICATIONS

Yan, Xiaohui, et al., A Biterm Topic Model for Short Texts, World Wide Web Conference Committee (IW3C2), May 13-17, 2013.

(Continued)

*Primary Examiner* — Martin Lerner
(74) *Attorney, Agent, or Firm* — Fitch, Even, Tabin & Flannery LLP

(57) ABSTRACT

A system for short text identification can determine a plurality of topics and a representative noun that identifies each of the topics in a data repository. The system can determine a co-occurrence matrix for the training words stored in the corpus and determine a word vector embedding for each of the training words in the corpus to relate each of the training words in the corpus to other ones of the training words in the corpus in an n-dimensional vector space. The system can determine word tokens for words in short text in documents in the data repository that is separate and distinct from the corpus and determine sentence vectors for short text based on the word vectors in each short text and determine a plurality of topics in the documents based on clustering of sentence vectors, wherein the plurality of topics indicates topics that are predominant in the documents in the data repository.

16 Claims, 6 Drawing Sheets

(56) References Cited

U.S. PATENT DOCUMENTS

| | | | |
|---|---|---|---|
| 2011/0179034 A1* | 7/2011 | Takamatsu | G06F 40/284 |
| | | | 707/738 |
| 2013/0204885 A1* | 8/2013 | Clinchant | G06F 16/355 |
| | | | 707/756 |
| 2017/0004208 A1* | 1/2017 | Podder | G06F 40/30 |
| 2017/0060997 A1* | 3/2017 | Lee | G06F 40/284 |
| 2018/0039620 A1* | 2/2018 | Ciulla | G06F 40/30 |
| 2018/0068371 A1* | 3/2018 | Krishnamurthy | G06F 40/274 |
| 2018/0285345 A1* | 10/2018 | Pradhan | G06F 40/30 |
| 2019/0026348 A1* | 1/2019 | Li | G06F 40/30 |
| 2019/0057310 A1* | 2/2019 | Olmstead | G06F 40/284 |
| 2019/0325029 A1* | 10/2019 | Gandhi | G06F 40/284 |
| 2020/0110801 A1* | 4/2020 | Zheng | G06F 40/30 |
| 2020/0227026 A1* | 7/2020 | Rajagopal | G06F 40/35 |
| 2020/0293902 A1* | 9/2020 | Li | G06F 40/30 |
| 2021/0182328 A1* | 6/2021 | Rollings | G06F 40/295 |

FOREIGN PATENT DOCUMENTS

| | | |
|---|---|---|
| CN | 104866572 B | 5/2018 |
| CN | 108446813 A | 8/2018 |
| CN | 109509110 A | 3/2019 |

OTHER PUBLICATIONS

Qiang, Jipeng, et al., Topic Modeling over Short Texts by Incorporating Word Embeddings, Sep. 27, 2016.

* cited by examiner

302 → 
303 → Top Words: ship, free, price, delivery, fast

Top Comments
- faster shipping times for the free shipping option
- free shipping with faster delivery
- make the free shipping faster
- faster shipping would be nice when i have free shipping
- great price along with fast shipping 306 → Fast/Free Shipping

FIG. 3A

304 → 
305 → Top Words: box, break, pack, damage, open

Top Comments
- it was loosely packed which caused the items to fall around breaking open the box
- box was smashed part of inside product was broken
- packing boxes could be heavyer as i have had one delivered with the bottom ripped open
- the boxes are often broken
- i had several boxes broken 308 → Broken/Damage box

FIG. 3B

SYSTEMS AND METHODS FOR SHORT TEXT IDENTIFICATION

BACKGROUND

Conventionally, evaluating short text require manual evaluation of documents, manual context analysis to interpret the short text in the documents, subjective classification of the documents and subjective determination of the trends in the documents. However, such procedures are time-consuming and labor intensive. Also, conventional machine learning techniques have difficulty in accurately determining the interpretation of short text due to lack of context in the document.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A-B and 4 illustrate examples of how the system determines the plurality of topics and determines a representative noun for the topic in accordance with various embodiments taught herein.

DETAILED DESCRIPTION

Figure 1:
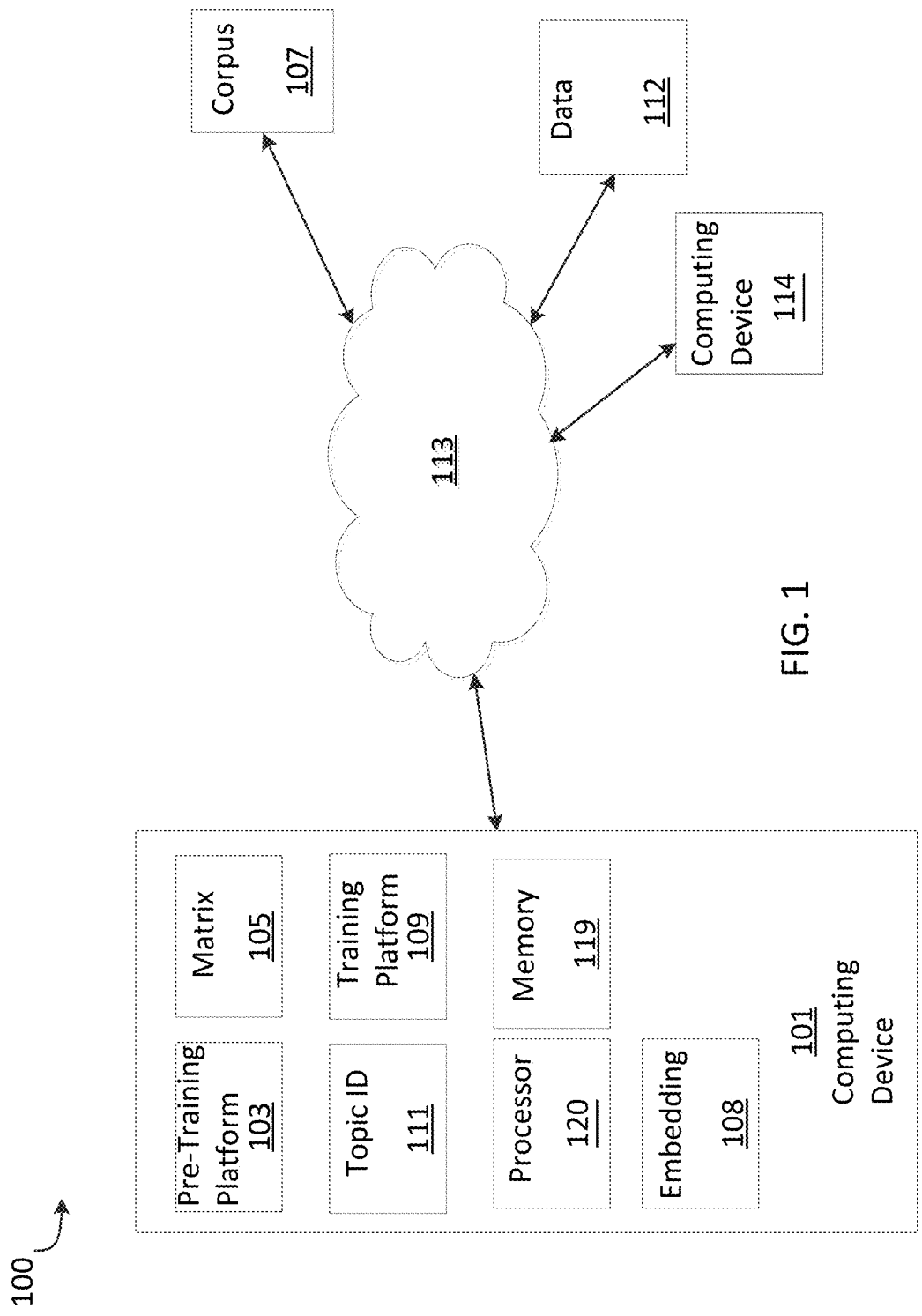
FIG. 1 is a block diagram illustrating a system for short text identification in accordance with various embodiments taught herein.

Short text identification conventionally requires manually seeking geographic locations of interest, manual recordation of item-descriptive data and corresponding item-property data at each location of interest, manually determining a difference value of one or more inconsistencies in the item-property data, and manual correction of those inconsistencies. However, such procedures are time-consuming, labor-intensive, and prone to human error. Additionally, traditional machine learning methods such as Latent Dirichlet Allocation (LDA) have difficulty with short text in documents. For example, LDA has difficulty with analysis of short text because of word semantics, the number of reviews, and limited word length. In LDA, word semantics can be issues because there may not be an ordering of words, and the machine learning algorithm may rely on word co-occurrence. Also, the dataset of these short texts may be limited which does not allow enough data for LDA to analyze the issues. Finally, the limited text length and the limited word features that allow for differentiation, such as co-occurrence, increases the model complexity as the size of short text data corpus increases.

As used herein, short text refers to phrases with two or more words. In some embodiments, short text may express sentiments such as "damaged items," "fast shipping" and the like.

Methods, systems, and non-transitory computer readable media are provided herein for short text identification that overcome the difficulties and problems described herein. The methods, systems, and non-transitory computer readable media, in accordance with various embodiments, are configured for short text identification. The methods, systems, and non-transitory computer readable media, in accordance with various embodiments, can be configured to execute a pre-trained platform programmed to determine a co-occurrence matrix for training words stored in a corpus of short text training data. The methods, systems, and non-transitory computer readable media, in accordance with various embodiments, can be configured to execute a training platform programmed to determine word vector embedding for each of the training words in the corpus of short text training data to relate each of the training words in the corpus to other ones of the training words in the corpus in an n-dimensional vector space. The methods, systems, and non-transitory computer readable media, in accordance with various embodiments, can be configured to execute a topic identification platform programmed to determine word tokens for words in sentences in documents in a data repository that is separate and distinct from the corpus of short text training data. The training platform can be programmed to determine word vectors for the word tokens based on the word vector embedding and the co-occurrence matrix, and can determine sentence vectors for sentences based on the word vectors in each sentence. The methods, systems, and non-transitory computer readable media, in accordance with various embodiments, can be configured to execute the topic identification platform to determine a plurality of topics for short text in the documents based on clustering of sentence vectors.

Referring now to FIG. 1, an exemplary system 100 for short text identification includes a first computing device 101 including a pre-training platform 103 programmed to determine a co-occurrence matrix 105 for training words stored in a corpus 107 of short text training data. The first computing device 101 also includes a training platform 109 programmed to generate word vector embedding for each of the training words in the corpus 107 to relate each of the training words in the corpus 107 to other ones of the training words in the corpus in an n-dimensional vector space. In some embodiments the first computing device 101 can train a short text model for short text word tokens for words based on the training words in the corpus 107. For example, the first computing device 101 can train the short text model by determining a short text model based on the word vectors, sentence vectors based on the corpus 107.

The first computing device 101 also includes a topic identification platform 111 programmed to determine word tokens for words in short text in documents in a data repository 112 after the short text model is trained. The data repository 112 is separate and distinct from the corpus. The topic identification platform 111 is programmed to determine word vectors for the word tokens based on the word vector embedding and the co-occurrence matrix, and determine sentence vectors for short text based on the word vectors in each short text. The topic identification platform 111 is programmed to determine a plurality of topics in the documents based on clustering of sentence vectors. The topic identification platform 111 uses clustering of sentence vectors to identify trends in the data repository 112. For example, the current survey results in a grocery store can provide information about the new initiatives like restructuring of the storefronts, new ship to home from storefronts, changes in products carried, changes in prices of products or the like. The topic identification platform 111 can determine a plurality of topics from the recent survey such that the plurality of topics indicates topics that are predominant in the documents in the data repository 112.

In example embodiments, the first computing device 101 can execute the pre-training platform. The first computing device 101 or a second computing device 114 can execute the topic identification platform 111 and the training platform 109. The first computing device 101 and/or the second computing device 114 can be in communication via one or more communications networks 113 (e.g., a mobile network, a Wi-Fi network, a local network, the internet, or a secure network) for requesting and receiving training words stored in the corpus 107 and/or short text in the data repository 112 to be identified.

The first computing device 101 and/or the second computing device 114 can be any suitable device including, for example, a smartphone, a cellular phone, a satellite phone, a tablet, a personal digital assistant (PDA), a laptop, a desktop computer, a server, or combinations thereof. The pre-training platform, the training platform and/or the topic identification platform can be programmed to run supervised learning, unsupervised learning and/or reinforcement learning algorithms. Examples of machine learning algorithms that can be implemented via the pre-training platform, the training platform and/or the topic identification platform can include, but are not limited to Linear Regression, Logical Regression, Decision Tree, Support Vector Machine, Naïve Bayes, k-Nearest Neighbors, k-Means, Random Forest, Dimensionality Reduction algorithms such as GBM, XGBoost, LightGBM and CatBoost.

Examples of supervised learning algorithms that can be used in pre-training platform, the training platform and the topic identification platform can include regression, decision tree, random forest, k-Nearest Neighbors, Support Vector Machine, and Logic Regression. Examples of unsupervised learning algorithms that can be used in the pre-training platform, the training platform and/or the topic identification platform can include apriori algorithm and k-means. Examples of reinforcement learning algorithms that can be used in the pre-training platform, the training platform and/or the topic identification platform can include a Markov decision process.

Processor 120, in accordance with various embodiments, can include, for example, but is not limited to, a microchip, a processor, a microprocessor, a special purpose processor, an application specific integrated circuit, a microcontroller, a field programmable gate array, any other suitable processor, or combinations thereof. Memory 119, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

The corpus 107, in accordance with various embodiments, can be a set of documents that are collected by an organization. The documents in the corpus 107 can be tokenized to determine short texts that are indicative of the types of short text that are received and processed by the organization. Examples of short text in documents can include comments from users in response to surveys, short text from users on online messaging services and responses in a cellular network over short messaging services. For example, a grocery store can receive responses to in-store surveys that are formed as a group of words that do not have proper grammar, syntax, and/or sentence structure. Examples of short texts can include "good selection", "long wait times", and the like. The corpus 107 can also include short text that can indicate the specific negative and positive context in the short text that can be specific to the organization. Examples of short texts that can indicate negative connotation can include personnel retraining.

The data repository 112 can include documents from one or more surveys where response to the survey questions are in short text form. The documents in the data repository 112 can be collected over a defined period of time or can be collected in response to a certain survey that has not yet been analyzed.

Communication network 113, in accordance with various embodiments, can be, for example, be a wireless network or a wired network or combinations thereof. The first computing device 101 and the second computing device 114 can include, for example, any computational device, such as a workstation, desktop computer, server, laptop, handheld computer, tablet computer, mobile device, or other forms of computing or telecommunications device that is capable of communication and that has sufficient processor power and memory capacity to receive user-identification information and authenticate users of the network 113. More generally, the first computing device and or the second computing device as used herein, can include, for example, any computational device, such as a workstation, desktop computer, server, laptop, handheld computer, tablet computer, mobile device, or other forms of computing or telecommunications device that is capable of communication and that has sufficient processor power and memory capacity to perform the described function of each computing device.

In an exemplary operation, the system 100 can use the pre-training platform 103 to determine a co-occurrence matrix 105 for the training words in the corpus 107. For example, the pre-training platform 103 can determine a number of times or frequency a word or a group of words appears next to another word in a sentence or appears next to another group of words in a sentence that is part of the corpus 107. For example, the words "helpful associate" can co-occur in the database frequently with the words "grocery store." The pre-training platform 103 identifies the words that frequently co-occur in the corpus to generate list of co-occurring words. The pre-training platform 103 can then determine a co-occurrence matrix 105 based on a Global Vectors for Word Representation (GLoVE) algorithm to generate a word vector for each of the words in the list to link the co-occurring words to their corresponding word vector in the co-occurrence matrix 105.

The training platform 109 can interface with the corpus 107 and can determine word vector embedding for each of the training words in one training documents that relate to other training words in that training document. Examples of relationships can include words that are similar, words that are dissimilar, words that are equidistant from other words and/or words that occur in relation to other words and the like. The training platform 109 can iterate through each of the training documents in the corpus 107 to determine an n-dimensional vector space that is specific to the documents encountered in a specific industry. For example, grocery store surveys can have word relationships that are unique to the grocery stores. The training platform 109 can determine a model specific to the industry that accounts for these words that co-occurred in the corpus 107 to establish an n-dimensional vector space that provides better context for short-text identification. The use of the co-occurrence matrix allows the model to include context for identification of short text in the short-text model.

The training platform 109 can also determine the word vector, sentence vector embedding for each of the documents in the entire set of training documents in the corpus 107 to determine the word vector embedding 108 and/or sentence vector embedding for each of the words in the training documents that relate to other words/sentences in each of the training documents. The word vector embedding can relate words to each other in an n-dimensional vector space. In an embodiment, the system 100 can use the co-occurrence matrix 105 from the pre-training platform 103 to determine the word vector embedding 108 to allow word relationships in the corpus 107 to be mapped in an n-dimensional vector space.

The system 100 can execute the topic identification platform 111 to determine word tokens for words in documents in a data repository 112 to be identified and associated with topics after the short text model has been trained. The topic identification platform 111 can determine word tokens in short text in documents in the data repository 112. In some embodiments, the topic identification platform 111 can lemmatize the documents, remove stop words, punctuations, and sentences below a certain word length threshold. The topic identification platform 111 can determine the word vectors for the word tokens in the documents in the data repository 112 based on the word vector embedding and the co-occurrence matrix generated by the pre-training platform 103 and the training platform 109. In some embodiments, the topic identification platform 111 can prune word vectors based on cosine proximity of the words in the word vector embedding. The topic identification platform 111 can then determine sentence vectors for short text based on the word vectors in each short text. The topic identification platform 111 can determine a plurality of topics in the documents based on clustering of the sentence vectors to determine sentence vectors that frequently occur in the short texts in the data repository 112. In some embodiments, the topic identification platform 111 can use k-means clustering to determine the plurality of topics in the documents. The plurality of topics in the data repository 112 can indicate topics that are currently trending in the documents. For example, the currently trending topics in the data repository 112 can relate to a sale or a promotion for an item or a change in the layout of the store or a new product.

The topic identification platform 111 can use one or more grammatical parsers to determine a set of nouns that appear in each of the plurality of topics with the most representative noun phrases based on the word embedding. In some embodiments, the topic identification platform 111 can use one or more grammatical parsers to determine a set of nouns that appear in each of the plurality of topics with the most representative bigram based on the word embedding in the Euclidean space. The topic identification platform 111 can determine similar nouns (i.e., nouns that are similar to other nouns) from the set of nouns based on cosine similarity in the word vector embedding. These nouns can be a word or a group of words. Examples of grammatical parsers include Stanford parser, Gold parser and the like. The topic identification platform 111 can determine nouns that are similar to other nouns in the set of nouns based on cosine similarity in the word vector embedding. The topic identification platform 111 can normalize the similar nouns based on semantic similarity in the n-dimensional vector space for each of the plurality of topics. For example, to normalize the similar nouns the topic identification platform 111 can determine a refined set of nouns by combining nouns that are similar to each other for each of the topics. The topic identification platform 111 can cluster the normalized similar nouns in the refined set of nouns to determine a representative noun that best fits each topic in each of the topics. For example, the topic identification platform 111 can determine the noun which has the least distance to other nouns in the set of nouns to determine the noun that best fits the topic. The topic identification platform 111 can name each of the topics in the topics based on the representative noun that corresponds to each of the topics.

In some embodiments, the topic identification platform 111 can then determine dissimilar nouns (i.e., nouns that are dissimilar to other nouns) in the set of nouns based on cosine similarity in the word vector embedding. The topic identification platform 111 can normalize the dissimilar nouns based on semantic dissimilarity in the n-dimensional vector space for each of the plurality of topics. For example, to normalize the dissimilar nouns, the topic identification platform 111 can determine a refined set of nouns by combining nouns that are dissimilar to each other for each of the topics. The topic identification platform 111 can then cluster the normalized dissimilar nouns to determine a non-representative noun that best fits each topic. The topic identification platform 111 can then name each of the topics based on the noun opposite to the non-representative noun that corresponds to each of the topics. For example, the topic identification platform 111 can determine the noun opposite to the non-representative noun in the n-dimensional vector space that corresponds to each of the plurality of topics based on the vector embedding and cosine similarly to identify nouns that mean the opposite of each other.

In some embodiments, the topic identification platform 111 can determine similar nouns (i.e., nouns that are similar to other nouns) based on Euclidean space of the nouns for each of the topics. In some embodiments, the topic identification platform 111 can identify a representative noun in each of the plurality of topics based on nouns in the set of nouns having the shortest distance in n-dimensional vector space to other nouns in each of the topics. In some embodiments, the topic identification platform 111 can determine representative nouns in each of the topics based on at least one of dependency parsing, natural language processing tagging and part of speech tagging. The topic identification platform 111 can cluster the similar nouns to determine a representative noun that best fits each topic in each of the plurality of topics. The topic identification platform 111 can name each of the topics based on the representative noun that corresponds to each of the plurality of topics.

Figure 2:
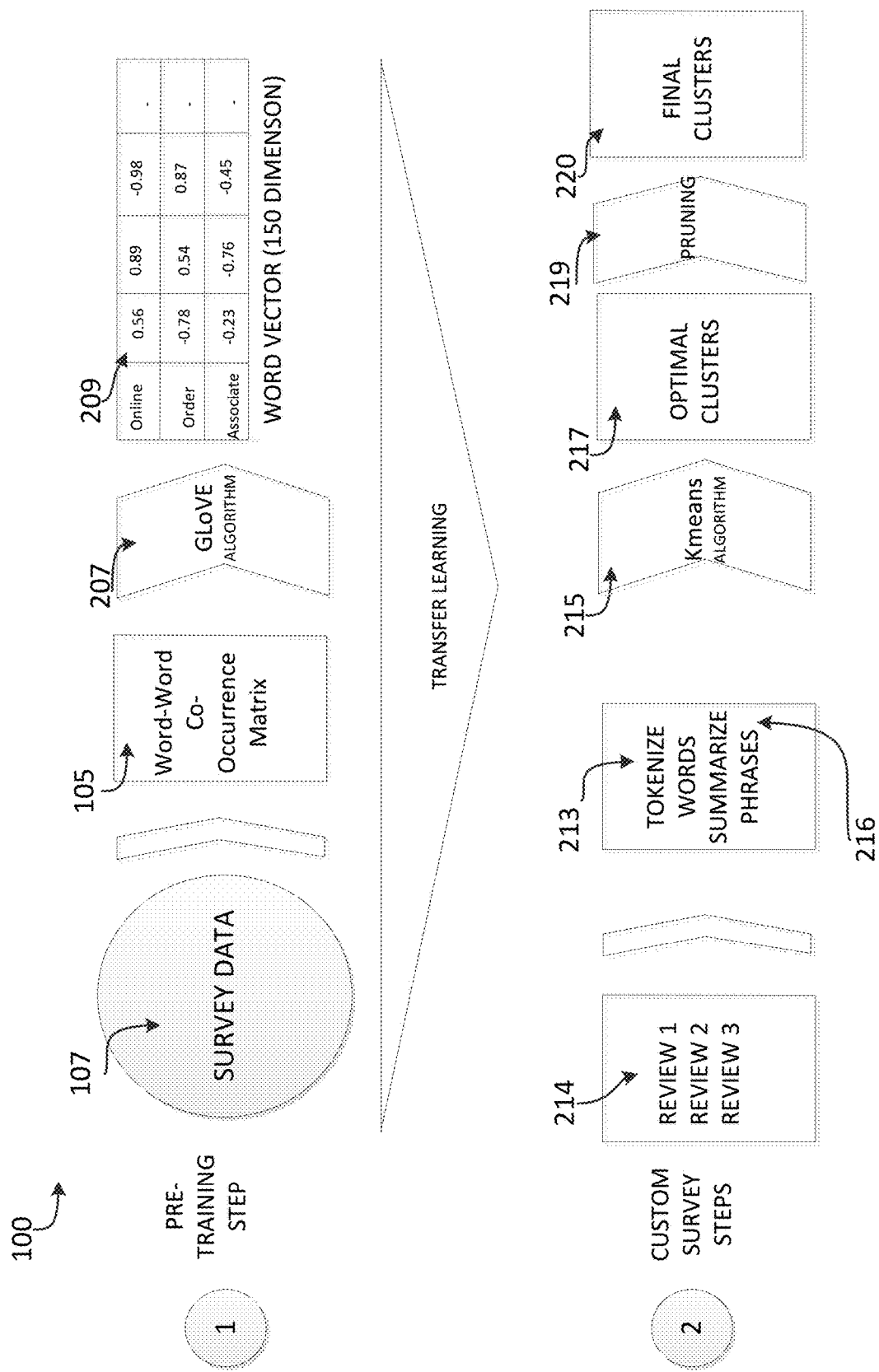
FIG. 2 is a system flow diagram illustrating pre-training and determining of a plurality of topics in accordance with various embodiments taught herein.

As illustrated by FIG. 2, by way of non-limiting example, an embodiment of the system 100 can be used to determine a word vector 209 for words in the co-occurrence matrix during pre-training. FIG. 2 also shows the use of the word vector 209 to identify topics 220 from the corpus 107 during pre-training.

The pre-training platform 103 can use the corpus 107 to determine the number of times or frequency with which a word or a group of words that appears next to another word or another group of words in a sentence present in a training document that is part of the corpus 107. For example, the words "helpful associate" can co-occur in the database frequently next to the words "grocery store". The pre-training platform 103 identifies the words that are frequently co-occurring to generate a list of words that co-occur. The pre-training platform 103 can then determine a co-occurrence matrix 105 based on a GLoVE algorithm 207 to generate a word vector for each of the words that co-occur to link the co-occurring words to their corresponding word vector 209 in the co-occurrence matrix 105.

The system 100 can execute the topic identification platform 111 to determine word tokens for words in documents 214 in a data repository 112. The documents 214 in the data repository 112 can include short text and can be separate and distinct from the corpus 107. The topic identification platform 111 can determine word tokens 213 for the words in the short text in the documents 214 that are part of the data repository 112. In some embodiments, the topic identification platform 111 can lemmatize the documents 214 to remove stop words, punctuations, and sentences below a certain word length threshold. The topic identification platform 111 can determine the word vectors for the word tokens 213 based on the word vector embedding and the co-occurrence matrix 105. In some embodiments, the topic identification platform 111 can prune word vectors based on cosine proximity of the words in the word vector embedding. The topic identification platform 111 can then determine sentence vectors 216 for the short text based on the word vectors in each short text. The topic identification platform 111 can determine topics in the documents based on clustering 215 of the sentence vectors 216 to determine those sentence vectors 216 that frequently occur in the short texts in the data repository 112. In some embodiments, the topic identification platform 111 can use k-means clustering 215 to determine optimal clusters 217. The topic identification platform 111 can determine a final cluster or a plurality of topics 220 in the documents based on pruning 219 of the optimal clusters 217. In an example, the k-means algorithm can be used to reduce the intra-cluster distance and increase the inter-cluster distance. In an example, the topic identification platform 111 can assign a closure to each sentence vector. In topic identification platform 111 can prune 219 the clusters based on the topic quality and document coverage. In an example, a heuristic threshold can be used to determine the pruned topics ($t_c$) for each of the sentence vectors.

Heuristic Threshold: $t_c = \min\{\min(dist_c) + 4 \cdot sd(dist_c), 0.5\}$

The topics in the data repository 112 can indicate topics that are currently trending in the documents. For example, the currently trending topics in the data repository 112 can relate to a sale or a promotion for an item or a change in the layout of the store or a new product.

As illustrated by FIGS. 3A-B, by way of non-limiting example, in one application of the technology described herein, an embodiment of the system 100 can determine the topics 302/304 that are trending and a representative noun 306/308 for the topics 302/304. For example, the topic identification platform 111 can use the k-means algorithm to determine the top comments that are positive 302 in relation to shipping. Similarly, the topic identification platform 111 can use the k-means algorithm to determine the top comments that are negative 304 in relation to shipping. For example, the topic identification platform 111 can determine a set of nouns 303/305 using a dependency parser that is frequently encountered in sentence vectors in the sentence vectors for each of the topics 302/304. The topic identification platform 111 can then determine nouns that are similar to each other in the set of nouns 303/305. For example, the topic identification platform 111 can determine that "free" and "price" are similar nouns and "fast" and "shipping" are similar nouns in the set of nouns 303. The topic identification platform 111 can then determine a representative noun 306/308 that identifies the topic of the set of documents based on at least one of Euclidean space of the set of nouns, word vector of the set of nouns, the noun that has the shortest distance with all other nouns in the set of nouns. In some embodiments, the topic identification platform 111 can determine the shortest distance between the nouns in the n-dimension vector space for all nouns in the set of nouns.

In an example, each of the sentence vectors can belong to more than one topic. In some embodiments, as shown in FIGS. 3A-B, the topic identification platform 111 can determine the positive comments 302 correspond to a representative noun phrase "fast/free shipping" 306 and the negative comments 304 correspond to a representative noun phrase "broken/damaged box" 308.

Figure 4:
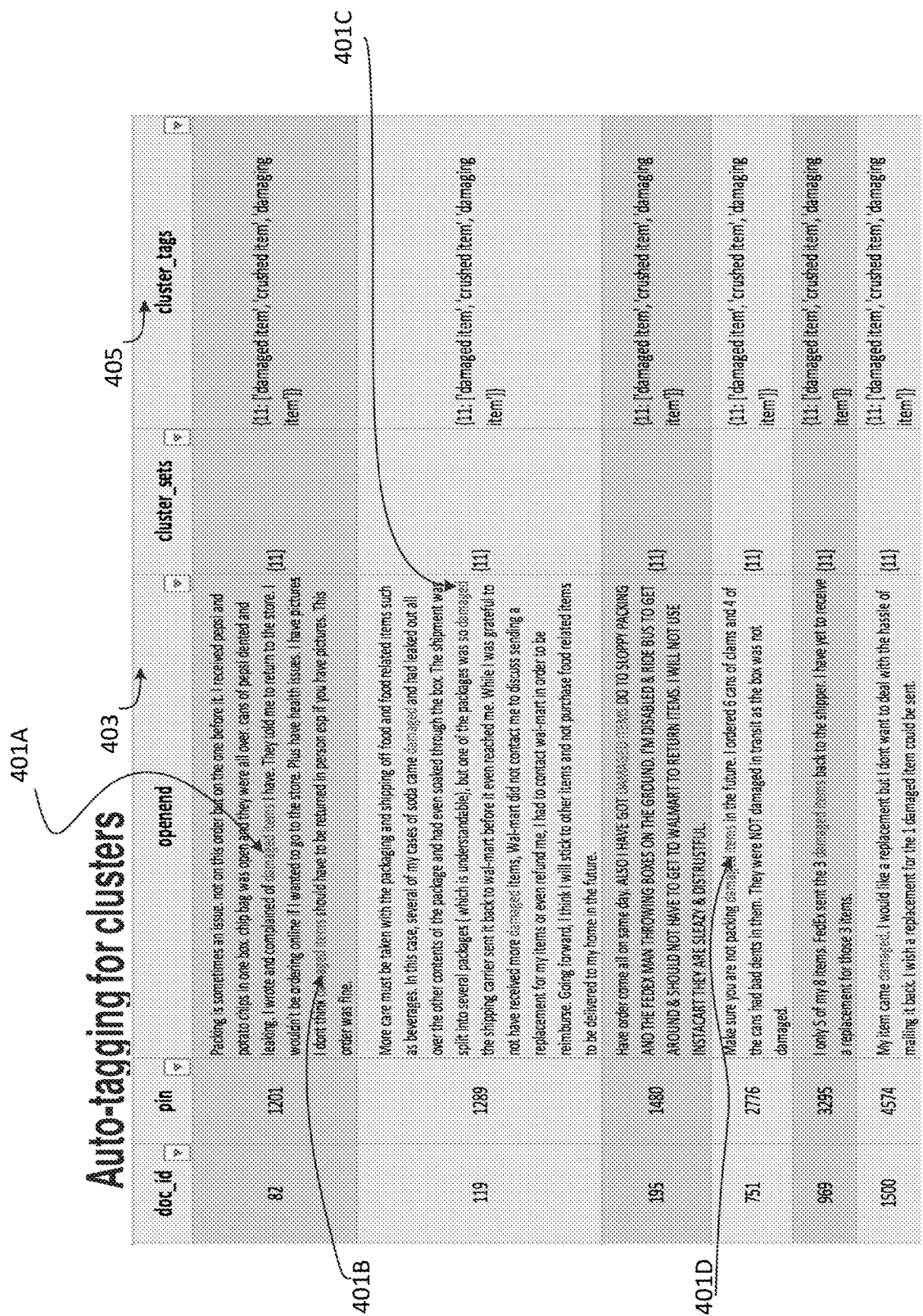

As illustrated by FIG. 4, by way of non-limiting example, in one application of the technology described herein, an embodiment of the system 100 can determine words that are similar based on cosine similarity.

The topic identification platform 111 can determine a set of nouns 401A, 401B, 401C, 401D based on a frequency of occurrence of the nouns in topics 403. The topic identification platform 111 can determine nouns that are similar to each other in the set of nouns. For example, the topic identification platform 111 can determine that "damaged items" 401A can be similar to "damaged" 401C. The topic identification platform 111 can also combine nouns 405 that have cosine similarly, such as "crushed item" as shown in FIG. 4 to determine a refined set of nouns.

Figure 5:
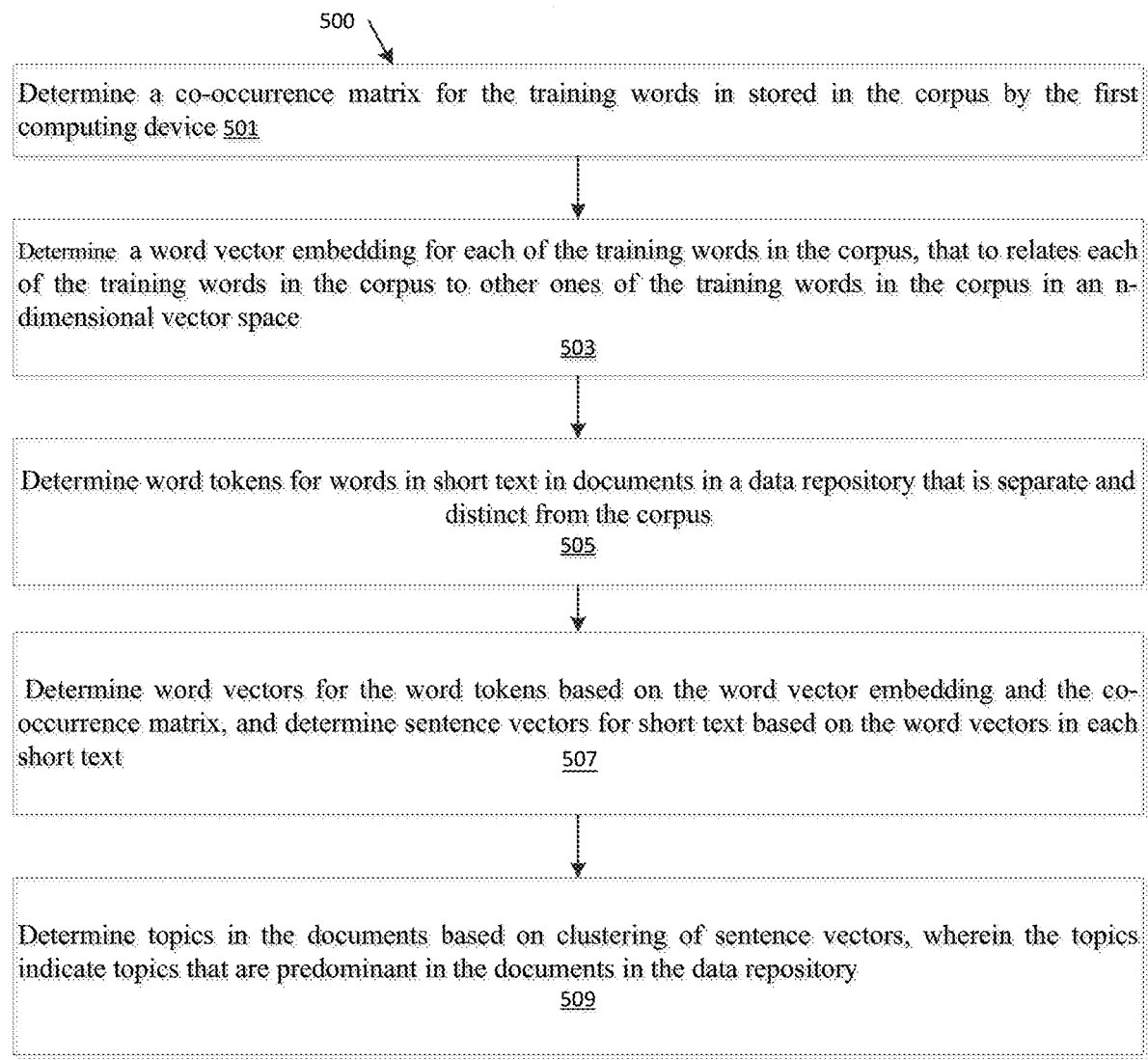
FIG. 5 is a flow diagram illustrating a method of short text identification in accordance with various embodiments taught herein.

Referring now to FIG. 5, an exemplary process 500 is illustrated providing short text identification in accordance with embodiments of the present disclosure. At step 501, instructions are executed by a first computing device to determine a co-occurrence matrix for training words stored in a corpus of training data. The step 501 of determining a co-occurrence matrix for the training words stored in the corpus by the first computing device 101 can be performed as described above with reference to FIG. 1.

At step 503, the first computing device or a second computing device programmatically determines a word vector embedding for each of the training words in the corpus to relate each of the training words in the corpus to other ones of the training words in the corpus in an n-dimensional vector space. The step 503 of determining a word vector embedding for each of the training words in the corpus to relate each of the training words in the corpus to other ones of the training words in the corpus in an n-dimensional vector space can be performed, for example but not limited to, using the first computing device 101 or the second computing device as described above with reference to FIG. 1. At step 505, the first computing device or the second computing device determines word tokens for words in short text in documents in a data repository that is separate and distinct from the corpus. The step 505 of determining word tokens for words in short text in documents in a data repository that is separate and distinct from the corpus can be performed, for example, but not limited to, using the first computing device 101 or the second computing device 114 as described above with reference to FIG. 1.

At step 507, the first computing device or the second computing device determines word vectors for the word tokens based on the word vector embedding and the co-occurrence matrix, and determines sentence vectors for short text based on the word vectors in each short text. The step 507 of determining word vectors for the word tokens based on the word vector embedding and the co-occurrence matrix, and determine sentence vectors for short text based on the word vectors in each short text can be performed, for example but not limited to, by the first computing device 101 or a second computing device as described above with reference to FIG. 1.

At step 509, the first computing device or the second computing device determines topics in the documents based on clustering of sentence vectors, wherein the topics indicate topics that are predominant in the documents in the data repository. The step 509 of determining, by the first computing device or a second computing device, a plurality of topics in the documents based on clustering of sentence vectors, wherein the plurality of topics indicates topics that are predominant in the documents in the data repository can be performed, for example but not limited to, using first computing device 101 or the second computing device as described above with reference to FIG. 1.

Figure 6:
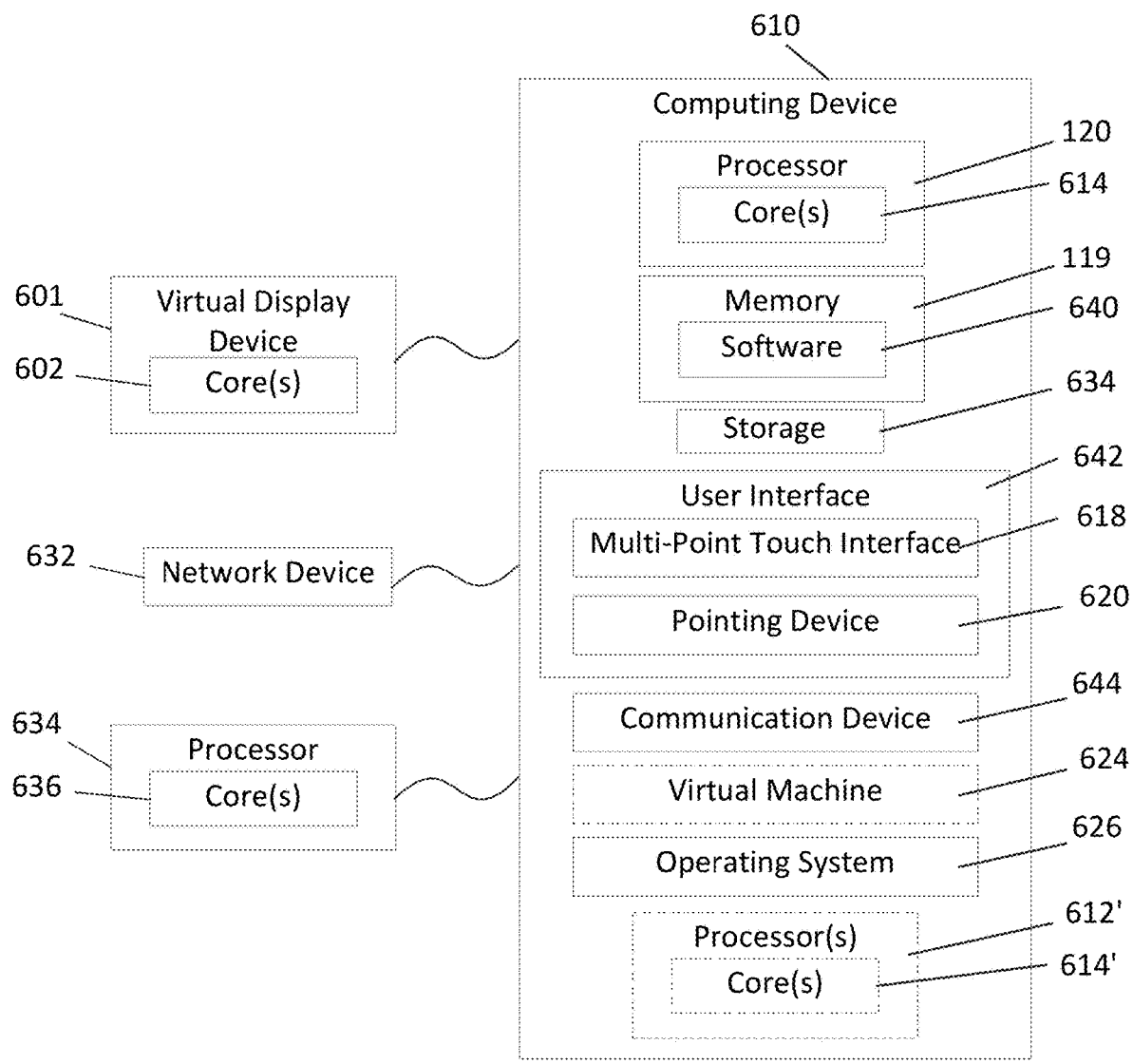
FIG. 6 is an example computational device block diagram depicting various components which can be used to implement various embodiments taught herein.

FIG. 6 is a block diagram of an exemplary embodiment of computing device 101 in accordance with embodiments of the present disclosure. The computing device 101 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 119 included in the computing device 101 can store computer-readable and computer-executable instructions or software for performing the operations disclosed herein. For example, the memory 119 can store a software application 640 which is configured to perform several of the disclosed operations (e.g., the pre-training platform for determining the co-occurrence matrix, the training platform for determining the word vectors and the topic determination platform for determining the plurality of topics and the representative noun). The computing device 610 can also include configurable and/or programmable processor 120 and an associated core(s) 614, and optionally, one or more additional configurable and/or programmable processing devices, e.g., processor(s) 612' and associated core(s) 614' (for example, in the case of computational devices having multiple processors/cores), for executing computer-readable and computer-executable instructions or software application 640 stored in the memory 119 and other programs for controlling system hardware. Processor 120 and processor(s) 612' can each be a single-core processor or multiple core (614 and 614') processor.

Virtualization can be employed in the computing device 610 so that infrastructure and resources in the computing device can be shared dynamically. A virtual machine 624 can be provided to handle a process running on multiple processors so that the process appears to be using only one computing resource rather than multiple computing resources. Multiple virtual machines can also be used with one processor.

Memory 119 can include a computational device memory or random access memory, such as DRAM, SRAM, EDO RAM, and the like. Memory 119 can include other types of memory as well, or combinations thereof.

A user can interact with the computing device 610 through a visual display device 601, such as a computer monitor, which can display one or more user interfaces 642 that can be provided in accordance with exemplary embodiments. The computing device 610 can include other I/O devices for receiving input from a user, for example, a keyboard or any suitable multi-point touch interface 618, a pointing device 620 (e.g., a mouse). The keyboard and the pointing device 620 can be coupled to the visual display device 601. The computing device 610 can include other suitable conventional I/O peripherals.

The computing device 610 can also include one or more storage devices such as a hard-drive, CD-ROM, or other computer readable media, for storing data and computer-readable instructions and/or software that perform operations disclosed herein. Exemplary storage device 634 can also store one or more databases for storing any suitable information required to implement exemplary embodiments. The databases can be updated manually or automatically at any suitable time to add, delete, and/or update one or more items in the databases.

The computing device 610 can include a communication device 644 configured to interface via one or more network devices 632 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The communication device 644 can include a built-in network adapter, network interface card, PCMCIA network card, card bus network adapter, wireless network adapter, USB network adapter, modem, radio frequency transceiver, or any other device suitable for interfacing the computing device 610 to any type of network capable of communication and performing the operations described herein. Moreover, the computing device 610 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 610 can run any operating system 626, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 626 can be run in native mode or emulated mode. In an exemplary embodiment, the operating system 626 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts and that the steps in the exemplary flowcharts can be performed in a different order than the order shown in the illustrative flowcharts.

What is claimed is:

1. A system for short text identification, the system comprising:
a non-transitory computer-readable medium storing a corpus of training words;
a first computing device executing a pre-training platform programmed to determine a co-occurrence matrix for the training words stored in the corpus;
the first computing device or a second computing device executes a training platform programmed to determine a word vector embedding for each of the training words in the corpus to relate each of the training words in the corpus to other ones of the training words in the corpus in an n-dimensional vector space;
the first computing device or the second computing device executes a topic identification platform programmed to determine word tokens for words in short text in documents in a data repository that is separate and distinct from the corpus, the topic identification platform being programmed to determine word vectors for the word tokens based on the word vector embedding and the co-occurrence matrix, and determine sentence vectors for short text based on the word vectors in each short text; and
the first computing device or the second computing device executing the topic identification platform is programmed to determine a plurality of topics in the documents based on clustering of sentence vectors, wherein the plurality of topics indicates topics that are predominant in the documents in the data repository are identified;
wherein the plurality of topics are determined by lemmatizing the documents, removing stop words, removing at least some punctuations, removing sentences below a certain word length threshold, and pruning word vectors based on cosine proximity in the word vector embedding.

2. The system of claim 1, wherein the topic identification platform is programmed to:
identify a set of nouns in each document in each of the plurality of topics based on word embedding;
determine similar nouns from the set of nouns based on cosine similarity in the word vector embedding;
normalize the similar nouns based on semantic similarity in the n-dimensional vector space for each of the plurality of topics;
cluster the normalized similar nouns to determine a representative noun that best fits each topic in each of the plurality of topics; and
name each of the topics in the plurality of topics based on the representative noun that corresponds to each of the plurality of topics.

3. The system of claim 1, wherein the topic identification platform is programmed to:
identify a set of nouns in each document in each of the plurality of topics based on word embedding;
determine dissimilar nouns in the set of nouns based on cosine similarity in the word vector embedding;
normalize the dissimilar nouns based on semantic dissimilarity in the n-dimensional vector space for each of the plurality of topics;
cluster the normalized dissimilar nouns to determine a non-representative noun that best fits each topic in each of the plurality of topics; and
name each of the topics in the plurality of topics based on a noun that is opposite to the non-representative noun in the n-dimensional vector space that corresponds to each of the plurality of topics.

4. The system of claim 1, wherein the topic identification platform is programmed to:
identify a set of nouns in each document in each of the plurality of topics based on word embedding;
determine similar nouns in the set of nouns based on Euclidian Euclidean space of the nouns for each of the plurality of topics;
cluster the similar nouns to determine a representative noun that best fits each topic in each of the plurality of topics; and
name each of the topics in the plurality of topics based on the representative noun that corresponds to each of the plurality of topics.

5. The system of claim 1, wherein the topic identification platform is programmed to:
identify a set of nouns in each of the plurality of topics based on the frequency of appearance of nouns in documents in each of the plurality of topics;
identify a representative noun in each of the plurality of topics based on the nouns in the set of nouns having the shortest distance in n-dimensional vector space to other nouns in each of the plurality of topics; and
name each of the plurality of topics based on the representative noun in the n-dimensional vector space that corresponds to each of the plurality of topics.

6. The system of claim 1, wherein the topic identification platform is programmed to:
identify representative nouns in each of the plurality of topics based on at least one of dependency parsing, natural language processing tagging and part of speech tagging; and
naming each of the plurality of topics using the representative nouns.

7. The system of claim 1, wherein the plurality of topics is determined by the first computing device or the second computing device using k-means clustering.

8. A method for short text identification, the method comprising:
executing instructions by a first computing device programmed to determine a co-occurrence matrix for training words stored in a corpus;
determining, by the first computing device or a second computing device, a word vector embedding for each of the training words in the corpus to relate each of the training words in the corpus to other ones of the training words in the corpus in an n-dimensional vector space;
determining, by the first computing device or a second computing device, word tokens for words in short text in documents in a data repository that is separate and distinct from the corpus;
determining, by the first computing device or a second computing device, word vectors for the word tokens based on the word vector embedding and the co-occurrence matrix, and determine sentence vectors for short text based on the word vectors in each short text; and
determining, by the first computing device or a second computing device, a plurality of topics in the documents based on clustering of sentence vectors, wherein the plurality of topics indicates topics that are predominant in the documents in the data repository;

wherein the determining the plurality of topics comprises lemmatizing the documents, removing stop words, removing at least some punctuations, removing sentences below a certain word length threshold, and pruning word vectors based on cosine proximity in the word vector embedding.

9. The method of claim 8, wherein the method further comprises:
identifying, by the first computing device or the second computing device, a set of nouns in each document in each of the plurality of topics based on word embedding;
determining, by the first computing device or the second computing device, similar nouns from the set of nouns based on cosine similarity in the word vector embedding;
normalizing, by the first computing device or the second computing device, the similar nouns based on semantic similarity in the n-dimensional vector space for each of the plurality of topics;
clustering, by the first computing device or the second computing device, the normalized similar nouns in the refined set of nouns to determine a representative noun that best fits each topic in each of the plurality of topics; and
determining, by the first computing device or the second computing device, a name for each of the topics in the plurality of topics based on the representative noun that corresponds to each of the plurality of topics.

10. The method of claim 8, wherein the method further comprises:
identifying, by the first computing device or the second computing device, a set of nouns in each document in each of the plurality of topics based on word embedding;
determining, by the first computing device or the second computing device, dissimilar nouns in the set of nouns based on cosine similarity in the word vector embedding;
normalizing, by the first computing device or the second computing device, the similar nouns based on semantic similarity in the n-dimensional vector space for each of the plurality of topics;
clustering, by the first computing device or the second computing device, the normalized similar nouns in the refined set of nouns to determine a non-representative noun that best fits each topic in each of the plurality of topics; and
determining, by the first computing device or the second computing device, a name for each of the topics in the plurality of topics based on a noun that is opposite to the non-representative noun that corresponds to each of the plurality of topics.

11. The method of claim 8, wherein the method further comprises:
identifying, by the first computing device or the second computing device, a set of nouns in each document in each of the plurality of topics based on word embedding;
determining, by the first computing device or the second computing device, similar nouns based on Euclidean space of the nouns for each of the plurality of topics;
clustering, by the first computing device or the second computing device, the similar nouns to determine a representative noun that best fits each topic in each of the plurality of topics; and
determining, by the first computing device or the second computing device, a name for each of the topics in the plurality of topics based on the representative noun that corresponds to each of the plurality of topics.

12. The method of claim 8, wherein the method further comprises:
identifying, by the first computing device or the second computing device, a set of nouns in each of the plurality of topics based on the frequency of appearance of nouns in documents in each of the plurality of topics;
identifying, by the first computing device or the second computing device, a representative noun in each of the plurality of topics based on the nouns in the set of nouns having the shortest distance in n-dimensional vector space to other nouns in each of the plurality of topics; and
naming, by the first computing device or the second computing device, each of the plurality of topics based on the representative noun in the n-dimensional vector space that corresponds to each of the plurality of topics.

13. The method of claim 8, wherein the method further comprises:
identifying, by the first computing device or the second computing device, a frequency of appearance of nouns in each of the plurality of topics based on parsing of the sentences in each of the plurality of topics based on a dependency parser;
identifying, by the first computing device or the second computing device, representative nouns in each of the plurality of topics based on dependency parsing, natural language processing tagging and part of speech tagging; and
naming each of the plurality of topics using the representative nouns.

14. A non-transitory computer readable medium storing instructions executable by a processing device, wherein execution of the instructions causes the processing device to implement a method for short text identification, the method comprising:
executing instructions by a first computing device programmed to determine a co-occurrence matrix for the training words stored in a corpus;
determining, by the first computing device or a second computing device, a word vector embedding for each of the training words in the corpus to relate each of the training words in the corpus to other ones of the training words in the corpus in an n-dimensional vector space;
determining, by the first computing device or a second computing device, word tokens for words in short text in documents in a data repository that is separate and distinct from the corpus;
determining, by the first computing device or a second computing device, word vectors for the word tokens based on the word vector embedding and the co-occurrence matrix, and determine sentence vectors for short text based on the word vectors in each short text; and
determining, by the first computing device or a second computing device, a plurality of topics in the documents based on clustering of sentence vectors, wherein the plurality of topics indicates topics that are predominant in the documents in the data repository;

wherein the determining the plurality of topics comprises lemmatizing the documents, removing stop words, removing at least some punctuations, removing sentences below a certain word length threshold, and pruning word vectors based on cosine proximity in the word vector embedding.

15. The non-transitory computer readable medium of claim 14, wherein to the method further comprising:
identifying, by the first computing device or the second computing device, a set of nouns in each document in each of the plurality of topics based on word embedding;
determining, by the first computing device or the second computing device, similar nouns from the set of nouns based on cosine similarity in the word vector embedding;
normalizing, by the first computing device or the second computing device, the similar nouns based on semantic similarity in the n-dimensional vector space for each of the plurality of topics;
clustering, by the first computing device or the second computing device, the normalized nouns in the refined set of nouns to determine a representative noun that best fits each topic in each of the plurality of topics; and
determining, by the first computing device or the second computing device, a name for each of the topics in the plurality of topics based on the representative noun that corresponds to each of the plurality of topics.

16. The non-transitory computer readable medium of claim 14, wherein the method further comprising:
identifying, by the first computing device or the second computing device, a set of nouns in each document in each of the plurality of topics based on word embedding;
determining, by the first computing device or the second computing device, dissimilar nouns that are dissimilar to other nouns in the set of nouns based on cosine similarity in the word vector embedding;
normalizing, by the first computing device or the second computing device, the similar nouns based on semantic similarity in the n-dimensional vector space for each of the plurality of topics;
clustering, by the first computing device or the second computing device, the normalized similar nouns in the refined set of nouns to determine a non-representative noun that best fits each topic in each of the plurality of topics; and
determining, by the first computing device or the second computing device, a name for each of the topics in the plurality of topics based on a noun that is opposite to the non-representative noun that corresponds to each of the plurality of topics.

* * * * *

UNITED STATES PATENT AND TRADEMARK OFFICE
CERTIFICATE OF CORRECTION

| | |
|---|---|
| PATENT NO. | : 11,347,944 B2 |
| APPLICATION NO. | : 16/773697 |
| DATED | : May 31, 2022 |
| INVENTOR(S) | : Karun Dhingra et al. |

It is certified that error appears in the above-identified patent and that said Letters Patent is hereby corrected as shown below:

In the Claims

In Claim 4, at Column 12, Line 13, delete "Euclidian Euclidean" and insert --Euclidean--.

Signed and Sealed this
Seventeenth Day of October, 2023

*Katherine Kelly Vidal*

Katherine Kelly Vidal
*Director of the United States Patent and Trademark Office*